United States Patent
Uchida et al.

(10) Patent No.: US 10,245,939 B2
(45) Date of Patent: Apr. 2, 2019

(54) GRILLE SHUTTER DEVICE

(71) Applicant: AISIN SEIKI KABUSHIKI KAISHA, Kariya-shi (JP)

(72) Inventors: Shuhei Uchida, Kariya (JP); Yoshimasa Asano, Kariya (JP); Shigeki Sato, Anjo (JP); Kenji Hori, Toyota (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/824,093

(22) Filed: Nov. 28, 2017

(65) Prior Publication Data
US 2018/0154764 A1    Jun. 7, 2018

(30) Foreign Application Priority Data
Dec. 1, 2016  (JP) ................. 2016-234269

(51) Int. Cl.
*B60K 11/08*  (2006.01)
*B60R 19/48*  (2006.01)
*B60R 19/18*  (2006.01)

(52) U.S. Cl.
CPC ............ *B60K 11/085* (2013.01); *B60R 19/48* (2013.01); *B60R 2019/1806* (2013.01); *B60R 2019/486* (2013.01)

(58) Field of Classification Search
CPC ......... F01D 5/00; B60K 11/085; B60K 11/08; F01P 7/10
See application file for complete search history.

(56) References Cited

U.S. PATENT DOCUMENTS

| | | | | |
|---|---|---|---|---|
| 6,413,131 B1* | 7/2002 | Phillips | ............... | F02B 61/045 123/198 E |
| 8,302,714 B2* | 11/2012 | Charnesky | ............ | B60K 11/085 180/68.1 |
| 8,646,552 B2* | 2/2014 | Evans | .................. | B60K 11/085 180/68.1 |
| 8,931,824 B2* | 1/2015 | Lopez | .................... | B60R 21/34 293/117 |
| 9,061,585 B2* | 6/2015 | Fujiu | ..................... | B60K 11/08 |
| 2010/0132401 A1* | 6/2010 | Silva Dias | ............... | F24F 1/38 62/507 |
| 2014/0028051 A1* | 1/2014 | Oota | ....................... | B60R 21/34 296/187.04 |

FOREIGN PATENT DOCUMENTS

| | | |
|---|---|---|
| JP | 58-139519 U | 9/1983 |
| JP | 2016-97890 | 5/2016 |

* cited by examiner

*Primary Examiner* — James A Shriver, II
*Assistant Examiner* — James J Triggs
(74) *Attorney, Agent, or Firm* — Oblon, McClelland, Maier & Neustadt, L.L.P.

(57) ABSTRACT

A grille shutter device includes: a first bumper reinforcement extending in a vehicle width direction; and a shutter mechanism that is provided with a plurality of support members extending from the first bumper reinforcement in a direction intersecting with the vehicle width direction, is supported by the plurality of support members, and regulates a flow rate of air which flows into an engine room from a grille.

3 Claims, 4 Drawing Sheets

GRILLE SHUTTER DEVICE

CROSS REFERENCE TO RELATED APPLICATIONS

This application is based on and claims priority under 35 U.S.C. § 119 to Japanese Patent Application 2016-234269, filed on Dec. 1, 2016, the entire contents of which are incorporated herein by reference.

TECHNICAL FIELD

This disclosure relates to a grille shutter device.

BACKGROUND DISCUSSION

In the related art, a grille shutter device that regulates a flow rate of air that flows into an engine room is known.

A grille shutter device in JP 2016-97890A (Reference 1) includes a frame having a rectangular frame shape, a movable fin that is rotatably supported by the frame, and a lower absorber that is provided to absorb a load produced during collision of a vehicle. The frame has a lower frame that configures a lower side portion of the frame and that is attached to the lower absorber so that its surface is a smooth continuation of an upper surface of the lower absorber.

A grille shutter in Reference 1 is attached to an upper bumper reinforcement in an upper frame that configures an upper side portion of the frame. Therefore, a frame area of the frame, that is, a flow channel of air is narrow.

Thus, a need exists for a grille shutter device which is not susceptible to the drawback mentioned above.

SUMMARY

A gist of a grille shutter device according to an aspect of this disclosure resides in that the grill shutter device includes: a first bumper reinforcement extending in a vehicle width direction; and a shutter mechanism that is provided with a plurality of support members extending from the first bumper reinforcement in a direction intersecting with the vehicle width direction, is supported by the plurality of support members, and regulates a flow rate of air which flows into an engine room from a grille.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a grille shutter device will be described with reference to the figures.

Figure 1:
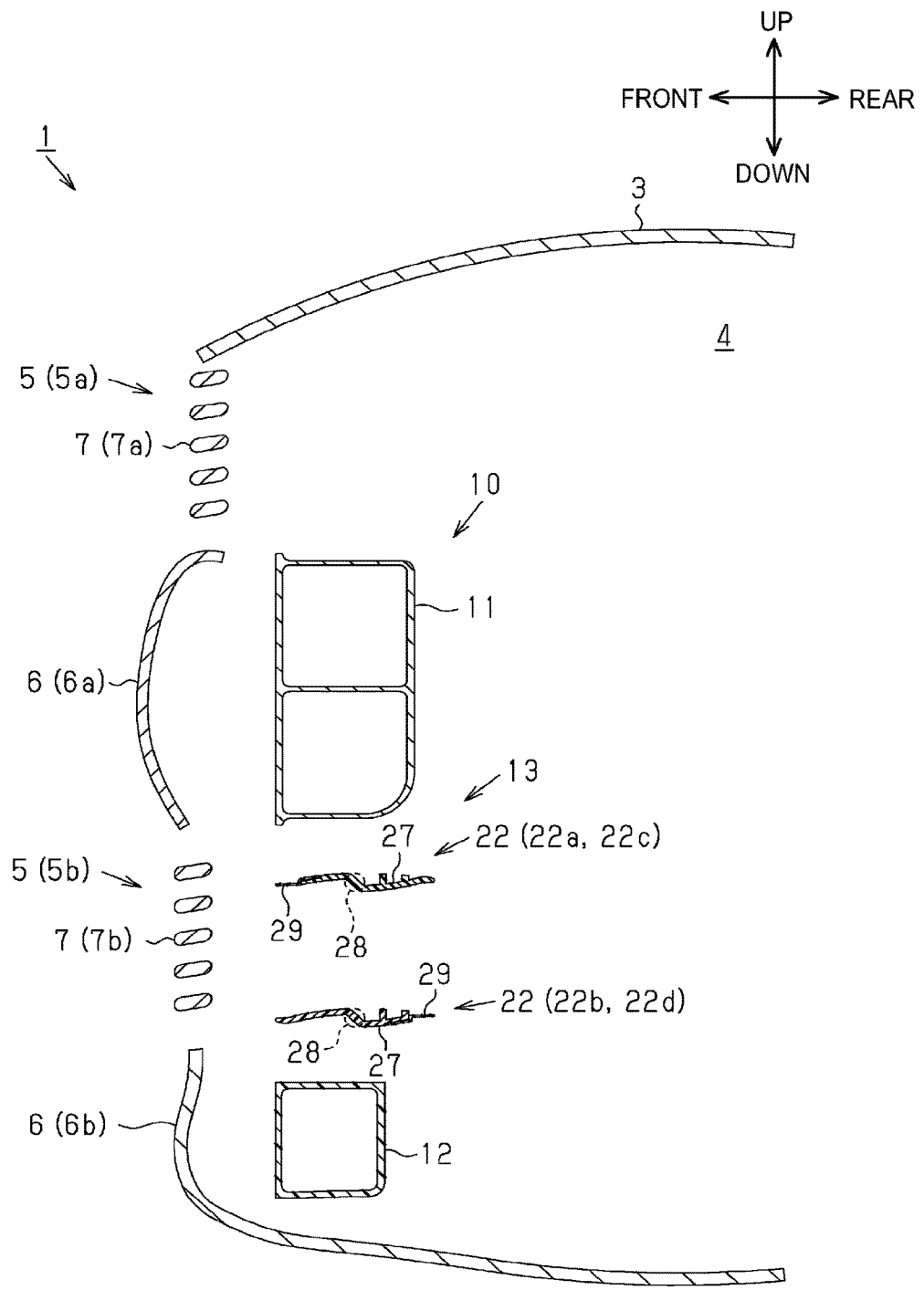
FIG. 1 is a schematic view illustrating an overview of a configuration of a vehicle on which a grille shutter device is mounted.

As illustrated in FIG. 1, a front end portion (in FIG. 1, an end portion on the left side) of a vehicle 1 is provided with a grille opening 5 and a bumper 6. An outside space in front of the vehicle and the engine room 4 provided under a front hood (bonnet) 3 communicate with each other through the grille opening 5. Specifically, the vehicle 1 includes two grille openings 5a and 5b and two bumpers 6a and 6b which extend in the vehicle width direction. The grille openings and the bumpers are alternately disposed such that grille opening 5a, the bumper 6a, the grille opening 5b, and the bumper 6b are disposed in this order to the lower side. In addition, opening ends of the grille openings 5a and 5b are provided with respective front grilles 7 (an upper grille 7a and a lower grille 7b) which configure a front design (front mask) of the vehicle 1. In the grille opening 5b formed between the bumper 6a and the bumper 6b, a grille shutter device 10 that is capable of controlling a flow rate of air that flows into the engine room 4 from the grille opening 5b.

Figure 2:
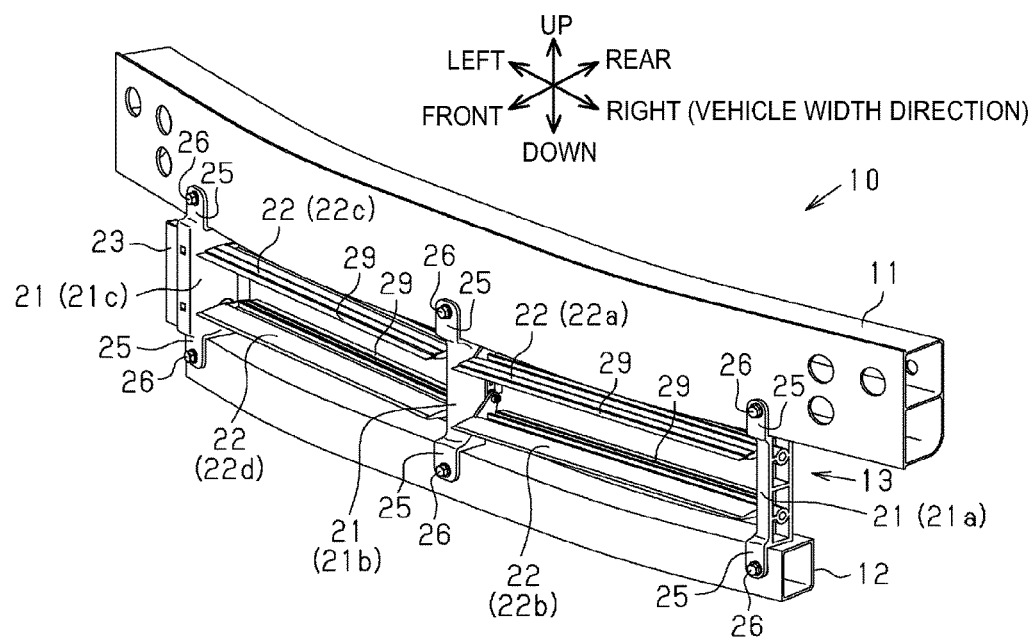
FIG. 2 is a perspective view of the grille shutter device.
Figure 3:
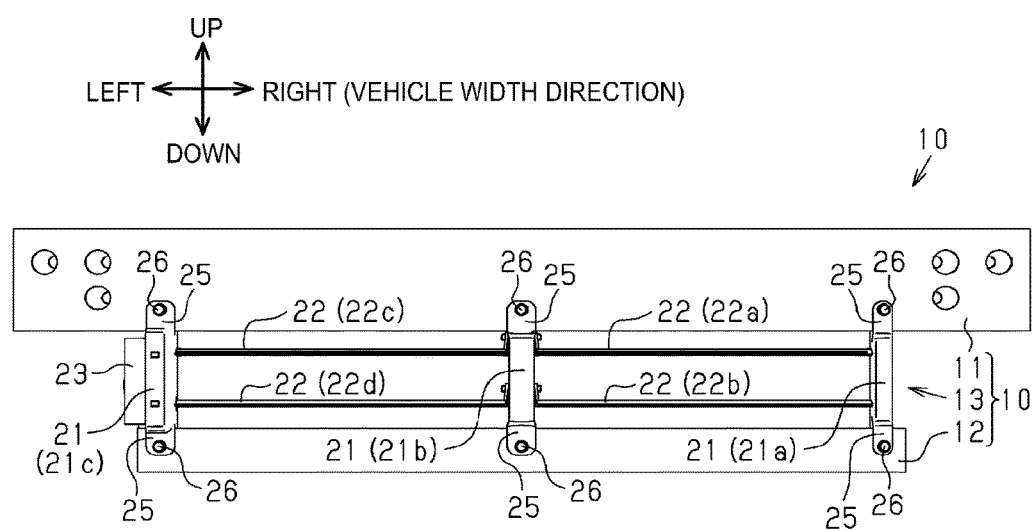
FIG. 3 is a front view of the grille shutter device.

As illustrated in FIGS. 1, 2, and 3, the grille shutter device 10 includes a first bumper reinforcement 11 and a second bumper reinforcement 12, which are fixed to a frame (not illustrated) that configures a basic frame of the vehicle 1, and a shutter mechanism 13 that is supported by the two bumper reinforcements.

The first bumper reinforcement 11 is a quadrangular cylinder member extending in the vehicle width direction and is provided in the engine room 4 behind the bumper 6a so as to be hidden by the bumper 6a in a front-side view.

The second bumper reinforcement 12 is a quadrangular cylinder member extending in the vehicle width direction and is provided in the engine room 4 behind the bumper 6b so as to be hidden by the bumper 6b in a front-side view.

The first bumper reinforcement 11 and the second bumper reinforcement 12 are smoothly curved such that the center portions thereof are positioned on the front side from both end portions in the vehicle width direction. In addition, the first bumper reinforcement 11 and the second bumper reinforcement 12 have a relationship in which the bumper reinforcements are positioned to be parallel to each other.

The shutter mechanism 13 is supported by the first bumper reinforcement 11 and the second bumper reinforcement 12 between the two bumper reinforcements. In other words, the shutter mechanism 13 is positioned in the grille opening 5b behind the lower grille 7b.

Specifically, as illustrated in FIG. 2, the shutter mechanism 13 includes a support member 21, a movable fin 22, and an actuator 23.

The support member 21 is a member that connects the first bumper reinforcement 11 and the second bumper reinforcement 12 which are separated from each other in an up-down direction and is a shaft-shaped member extending in the up-down direction. Front edge portions of an upper end portion and a lower end portion of the support member 21 are provided with sheet-shaped attachment portions 25 that extend outside (the upper side or the lower side) of the support member 21 in its axial direction. The attachment portion 25 is provided with a through-hole which penetrates through the attachment portion in a front-rear direction and in which a fastening tool 26, which will be described below, is inserted to be used.

The support member 21 has the attachment portion 25 which is disposed along front surfaces of the first bumper reinforcement 11 and the second bumper reinforcement 12. The support member 21 is attached to the first bumper reinforcement 11 and the second bumper reinforcement 12 via the fastening tool 26 such as a bolt and a nut.

The support member 21 of the example is a collective term for three of a right support member 21a, an intermediate support member 21b, and a left support member 21c. The right support member 21a, the intermediate support member 21b, and the left support member 21c are attached to the first bumper reinforcement 11 and the second bumper reinforcement 12 in a state of being disposed at equal intervals from each other.

The movable fin 22 has a sheet-shaped blade 27 extending in the vehicle width direction and circular cylinder-shaped rotary shafts 28 that project from both end portions of the blade 27. The rotary shafts 28 that project from both end portions of the blade 27 are provided to have the same axial core. The rotary shafts 28 of the example are provided at the center portion of the blade 27 in a sheet-width direction (front-rear direction in FIG. 1).

A size of the blade 27 in the vehicle width direction is set to be slightly smaller than a size between the support members 21 in the vehicle width direction. In addition, a size between the distal portions of the rotary shafts 28 in the vehicle width direction is set to be slightly larger than a size between the support members 21 in the vehicle width direction. In addition, a size per one movable fin 22 in the sheet-width direction is set to be about half of a size between the first bumper reinforcement 11 and the second bumper reinforcement 12.

The movable fin 22 is a collective term of a first fin 22a, a second fin 22b, a third fin 22c, and a fourth fin 22d. The first fin 22a and the second fin 22b are pivotably supported by the right support member 21a and the intermediate support member 21b between the two support members 21a and 21b, the third fin 22c and the fourth fin 22d are pivotably supported by the intermediate support member 21b and the left support member 21c between the two support members 21b and 21c.

The first fin 22a is positioned above the second fin 22b and is pivotably supported by the right support member 21a and the intermediate support member 21b such that a rear edge portion of the first fin 22a overlaps with a front edge portion of the second fin 22b when the first fin rotates and is displaced.

The third fin 22c is positioned above the fourth fin 22d and is pivotably supported by the intermediate support member 21b and the left support member 21c such that a rear edge portion of the third fin 22c overlaps with a front edge portion of the fourth fin 22d when the third fin rotates and is displaced.

The first fin 22a and the third fin 22c are provided with the blade 27 having a front edge portion to which a seal member 29 that extends in the sheet-width direction and is elastically deformable is attached. In addition, the second fin 22b and the fourth fin 22d are provided with the blade 27 having a rear edge portion to which a seal member 29 that extends in the sheet-width direction and is elastically deformable is attached. A size of the seal member 29 in the sheet-width direction is set to be longer than a size of the overlap between the rear edge portion of the first fin 22a and the front edge portion of the second fin 22b and a size of the overlap between the rear edge portion of the third fin 22c and the front edge portion of the fourth fin 22d.

The four movable fins 22 are connected to each other through a known link member provided in the intermediate support member 21b. In this manner, the four movable fins 22 are integrally rotated and displaced.

The actuator 23 is a drive source for rotating and driving the movable fins 22 and is attached to the left support member 21c.

Figure 4:
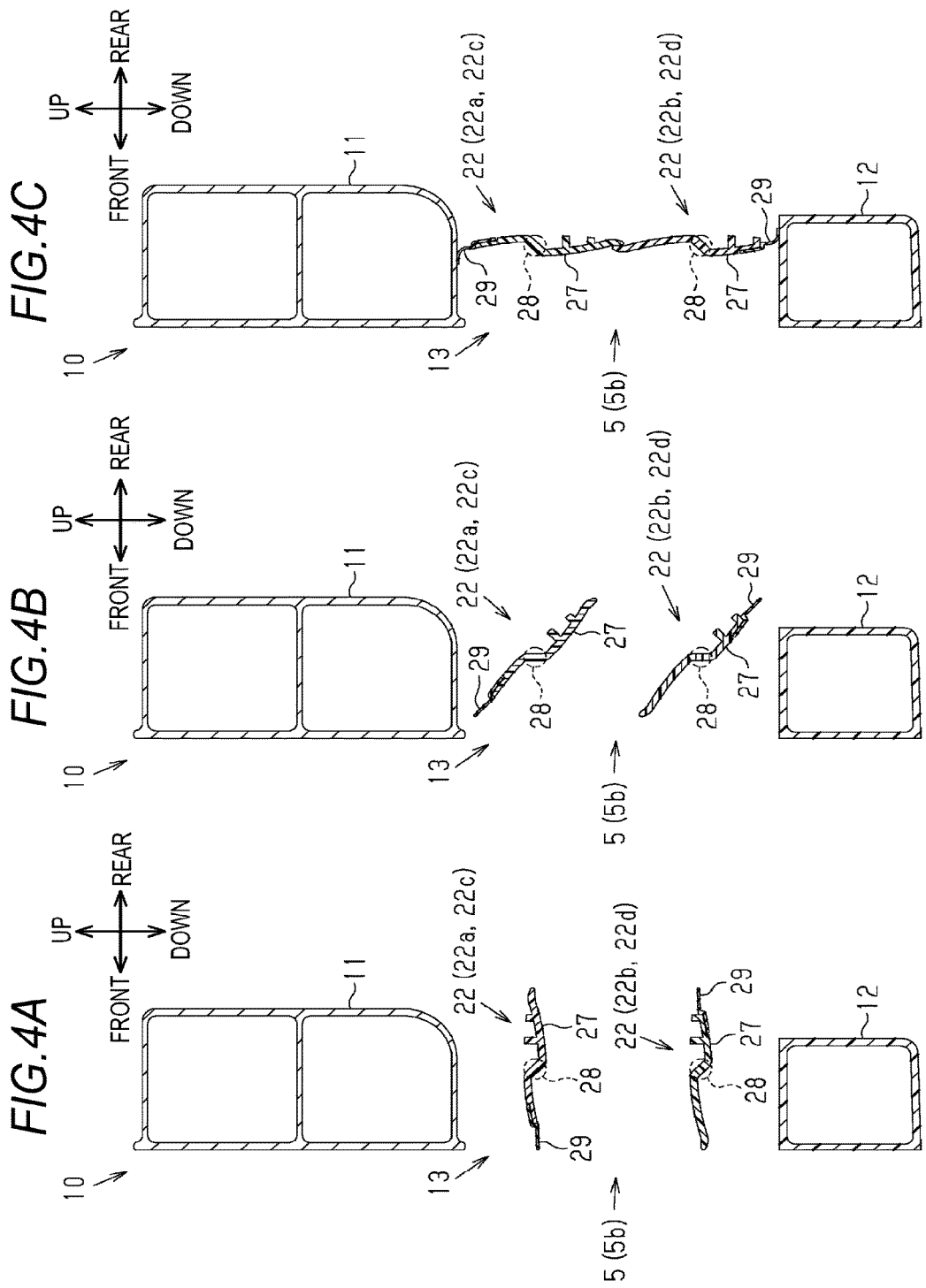
FIG. 4A is a schematic view illustrating a completely open state of the grille shutter device.
FIG. 4B is a schematic view illustrating an open state (intermediate state between the completely open state and a completely closed state) of the grille shutter device.
FIG. 4C is a schematic view illustrating the completely closed state of the grille shutter device.

As illustrated in FIGS. 4A, 4B, and 4C, the actuator 23 is driven, thereby rotating the movable fins 22. In this manner, the open and closed states of the grille opening 5b are switched with each other, and a flow rate of air from the outside through the grille opening 5b to the engine room 4 is regulated.

Next, operations and effects of the grille shutter device 10 will be described.

As illustrated in FIGS. 1, 2, and 3, the grille shutter device 10 is configured to include the shutter mechanism 13 between the first bumper reinforcement 11 and the second bumper reinforcement 12. In other words, the support member 21, which configures the shutter mechanism 13 and supports the movable fins 22 in a rotatable manner, is supported by the first bumper reinforcement 11 and the second bumper reinforcement 12 which cooperate with each other.

In this manner, the grille shutter device 10 of the example has a smaller number of constituent parts by the number of parts of the frame employed in the technology in the related art. Therefore, an area of an effective opening which is a flow channel of air flowing into the engine room 4 via the grille opening 5b is larger than that in the related art.

In addition, the vehicle 1, in which the grille shutter device 10 is employed, has a high strength in the front of the vehicle with the two bumper reinforcements of the first bumper reinforcement 11 and the second bumper reinforcement 12.

Further, the first bumper reinforcement 11 and the second bumper reinforcement 12 cooperate with each other so as to sandwich the three support members 21 therebetween. Therefore, the three support members 21 are unlikely to be displaced. Hence, the operation of the shutter mechanism 13 becomes also stable.

As illustrated in FIGS. 4A, 4B, and 4C, the first fin 22a and the third fin 22c are provided with the blade 27 having the front edge portion to which the seal member 29 that extends in the sheet-width direction and is elastically deformable is attached. In addition, the second fin 22b and the fourth fin 22d are provided with the blade 27 having a rear edge portion to which the seal member 29 that extends in the sheet-width direction and is elastically deformable is attached. In addition, the size of the seal member 29 in the sheet-width direction is set to be longer than the size of the overlap between the rear edge portion of the first fin 22a and the front edge portion of the second fin 22b and the size of the overlap between the rear edge portion of the third fin 22c and the front edge portion of the fourth fin 22d.

In such a configuration, when the movable fins 22 are rotated and displaced from a state illustrated in FIG. 4A in which the sheet-width direction of the blade 27 is parallel to the vehicle front-rear direction, through a state illustrated in FIG. 4B, to a state illustrated in FIG. 4C in which the sheet-width direction of the blade 27 is parallel to the vehicle up-down direction, the seal member 29 comes into contact with the lower surface of the first bumper reinforcement 11 and the upper surface of the second bumper reinforcement 12. Then, the seal member 29 is elastically deformed, thereby performing sealing between the first bumper reinforcement 11 and the front edge portions of the first fin 22a and the third fin 22c and between the second bumper reinforcement 12 and the rear edge portions of the second fin 22b and the fourth fin 22d. In this manner, the grille opening 5b is closed, and thereby an amount of air flowing into the engine room 4 via the grille opening 5b is reduced than that in the related art. Therefore, an effect of shortening time taken to warm up an engine (not illustrated) or the like is obtained.

In addition, even when there are variations in the size of the movable fins 22 to a certain degree, it is possible to close the grille opening 5b by the seal member 29. Therefore, it is easy to manufacture the shutter mechanism 13, and therefore to manufacture the grille shutter device 10.

The above-described embodiment may be modified as follows.

The vehicle 1 of the above-described embodiment is a vehicle that includes the two bumper reinforcements, that is, the first bumper reinforcement 11 and the second bumper reinforcement 12; however, the vehicle 1 may be a vehicle that includes an absorber. In a case where the grille shutter device is employed to such a vehicle including an absorber, the absorber may be included in the configuration of the grille shutter device.

Figure 5:
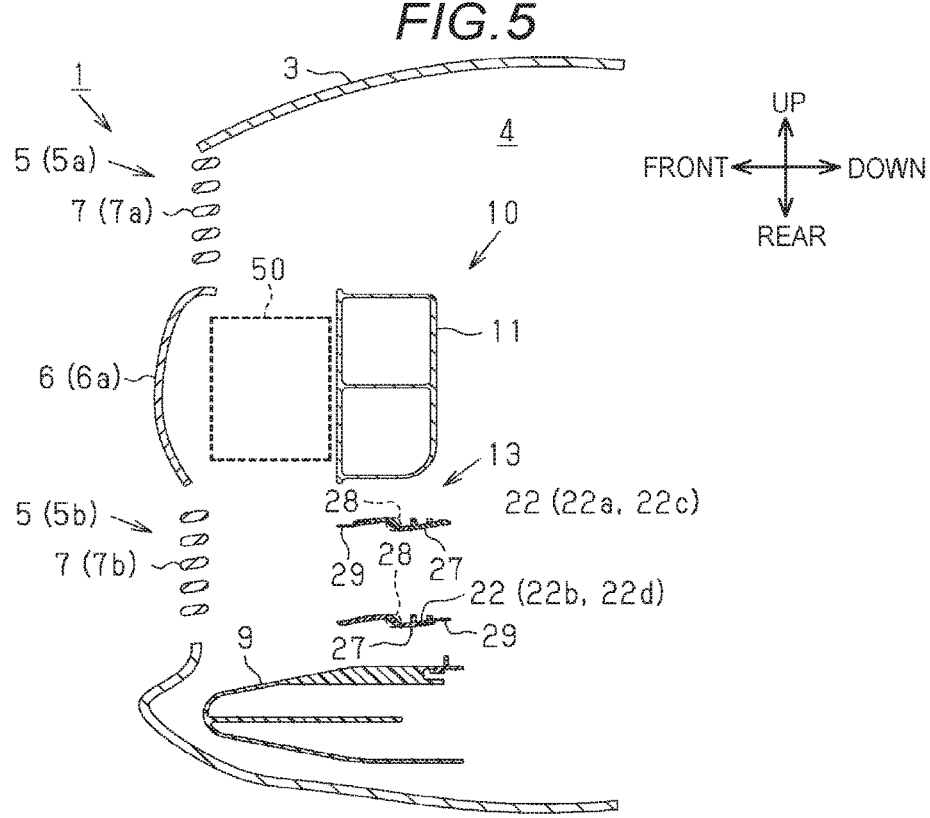
FIG. 5 is a schematic view illustrating another example of the grille shutter device.
Figure 6:
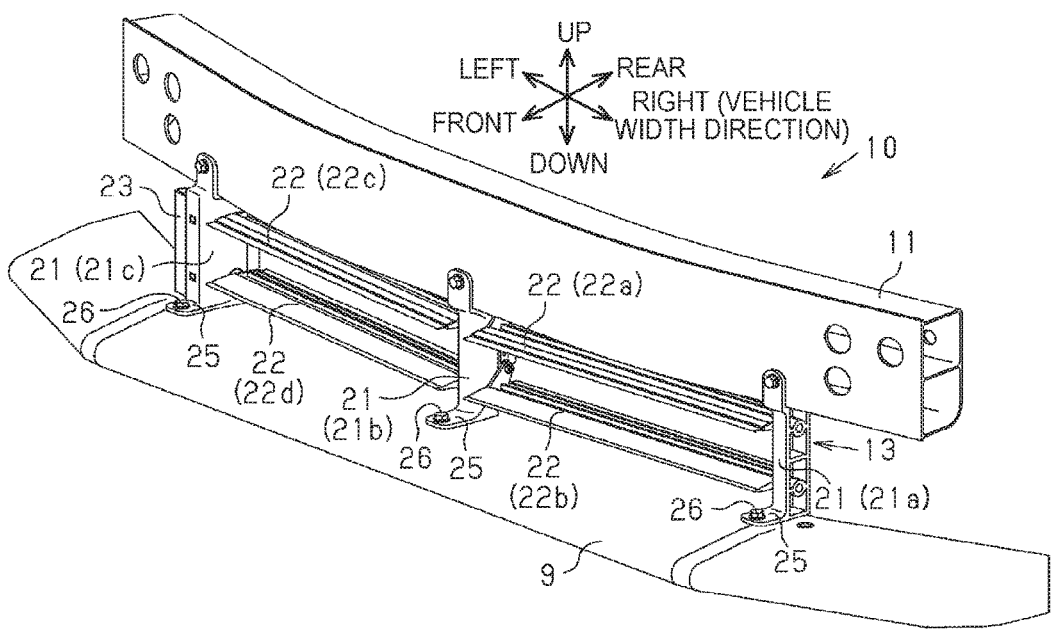
FIG. 6 is a schematic view illustrating the other example of the grille shutter device.

For example, as illustrated in FIGS. 5 and 6, the shutter mechanism 13 is provided between the first bumper reinforcement 11 and a lower absorber 9, and the grille shutter device 10 may be configured to include the lower absorber 9, the first bumper reinforcement 11, and the shutter mechanism 13.

According to such a configuration, the lower absorber 9 is capable of absorbing a collision load in the front of the vehicle. The lower absorber 9 causes feet (near shins) of a pedestrian to be lifted up, and thus an effect of reducing damage under the feet of the pedestrian is obtained.

Further, the first bumper reinforcement 11 and the lower absorber 9 cooperate with each other so as to sandwich the three support members 21 therebetween. Therefore, the three support members 21 are unlikely to be displaced. Hence, the operation of the shutter mechanism 13 becomes also stable.

The support of the support members 21 is not limited to the lower absorber 9, and the support members 21 may be supported between a frame or the like (not illustrated) of the vehicle and the first bumper reinforcement 11.

In the above-described embodiment, the shutter mechanism 13 may be supported by at least the first bumper reinforcement 11. In other words, the grille shutter device 10 may be configured to include the first bumper reinforcement 11 and the shutter mechanism 13. Even in a case of such a configuration, the grille shutter device 10 has the effect of having a larger area of the effective opening by an amount of omitting the frame than that in the related art.

In the above-described embodiment, the support member 21 and the first bumper reinforcement 11 and the second bumper reinforcement 12 are fixed to each other with the fastening tool 26; however, fixing between the member and the reinforcements is not limited to the fastening tool 26. The member and the reinforcements may have a fixed relationship by various methods of press-fitting, snap-fitting, welding, adhesion, or the like.

In the above-described embodiment, the first bumper reinforcement 11 and a bumper absorber 50 may be integrally provided, and the bumper absorber 50 may be positioned between the bumper 6 (upper bumper 6a) and the first bumper reinforcement 11. According to such a configuration, the bumper absorber 50 functions as an inner wall member that defines an internal shape of the grille opening 5. In this manner, it is possible to expect a rectification effect of air flowing from the grille opening 5. As a result, it is possible to ensure higher ventilation performance. Additionally, it is possible to integrally assemble the grille shutter device 10 and the bumper absorber 50 in the vehicle 1, and therefore an effect of an increase in assembly work efficiency is obtained.

In the above-described embodiment, the grille shutter device 10 is provided in the grille opening 5b and regulates an amount of air flowing into the engine room 4 via the grille opening 5b; however, the grille shutter device 10 may be provided in the grille opening 5a and may regulate an amount of air flowing into the engine room 4 via the grille opening 5a.

In the above-described embodiment, one grille opening 5 may be provided. Hence, the grille shutter device 10 may be applicable to a vehicle provided with a single grille opening 5.

In the above-described embodiment, the three support members 21 are provided; however it is possible to appropriately modify the number of support members as long as two support members are provided.

In the above-described embodiment, the actuator 23 is provided in the left support member 21c of the support members 21; however, the actuator 23 may be provided in any one of the support members 21. In addition, as long as it is possible to drive the movable fins 22, the actuator 23 is not limited to being provided in the support members 21 and may be provided in the bumper reinforcement, the absorber, or the like.

Next, a technical ideal from the above-described embodiment and the above-described example will be described.

A gist of a grille shutter device according to an aspect of this disclosure resides in that the grill shutter device includes: a first bumper reinforcement extending in a vehicle width direction; and a shutter mechanism that is provided with a plurality of support members extending from the first bumper reinforcement in a direction intersecting with the vehicle width direction, is supported by the plurality of support members, and regulates a flow rate of air which flows into an engine room from a grille.

According to this configuration, the first bumper reinforcement supports the shutter mechanism through support by the support members. In other words, the number of constituent parts of the grille shutter device is smaller by the number of parts of the frame employed in the technology in the related art. Therefore, it is possible to secure a larger area of an effective opening which is a flow channel of air flowing into an engine room from a grille than that in the related art.

In the configuration, it is preferable that an end of the support member on a side opposite to the first bumper reinforcement is connected to a second bumper reinforcement extending in the vehicle width direction.

According to the configuration, the strength increases in the front of a vehicle with the two bumper reinforcements, and the two bumper reinforcements cooperate with each other so as to sandwich the support member therebetween. Therefore, the support member is unlikely to be displaced. Hence, an operation of the shutter mechanism becomes also stable.

In the configuration, it is preferable that the end of the support member on the side opposite to the first bumper reinforcement is connected to an absorber.

According to this configuration, the front of the vehicle can absorb a collision load, and the bumper reinforcement and the absorber cooperate with each other so as to sandwich the support member therebetween. Therefore, the support member is unlikely to be displaced. Hence, the operation of the shutter mechanism becomes also stable.

In the configuration, it is preferable that the shutter mechanism includes a movable fin that is rotatably supported by the support member, and the movable fin has a distal portion provided with a seal member that is elastically deformable, a distance from a rotary shaft of the movable fin to a distal end of the seal member attached to the movable fin is set to be longer than a distance from the rotary shaft of the movable fin to the first bumper reinforcement, and a distance from the rotary shaft of the movable fin to the distal portion of the movable fin not including the seal member is set to be shorter than a distance from the rotary shaft of the movable fin to the first bumper reinforcement.

According to this configuration, sealing between the first bumper reinforcement and the movable fin is performed by the elastically deformable seal member. In this manner, flow of air into the engine room is reduced, and cooling of the engine can be weakened. Eventually, time for a warm-up operation of the engine is shortened.

In the grille shutter device of the aspect of this disclosure, it is possible to secure a wider flow path of air which flows into an engine room.

In the configuration, it is preferable that the absorber is a lower absorber.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A grille shutter device comprising:
a first bumper reinforcement extending in a vehicle width direction; and
a shutter mechanism that is provided with a plurality of support members extending from the first bumper reinforcement in a direction intersecting with the vehicle width direction, is supported by the plurality of support members, and regulates a flow rate of air which flows into an engine room from a grille, wherein
the shutter mechanism includes a movable fin that is rotatably supported by the plurality of support members,
the movable fin has a distal portion provided with a seal member that is elastically deformable, and
a distance from a rotary shaft of the movable fin to a distal end of the seal member attached to the movable fin is set to be longer than a distance from the rotary shaft of the movable fin to the first bumper reinforcement, and a distance from the rotary shaft of the movable fin to the distal portion of the movable fin not including the seal member is set to be shorter than a distance from the rotary shaft of the movable fin to the first bumper reinforcement.

2. A grille shutter device comprising:
a first bumper reinforcement extending in a vehicle width direction; and
a shutter mechanism that is provided with a plurality of support members extending from the first bumper reinforcement in a direction intersecting with the vehicle width direction, is supported by the plurality of support members, and regulates a flow rate of air which flows into an engine room from a grille, wherein
an end of the plurality of support members on a side opposite to the first bumper reinforcement is connected to a second bumper reinforcement extending in the vehicle width direction,
the shutter mechanism includes a movable fin that is rotatably supported by the plurality of support members,
the movable fin has a distal portion provided with a seal member that is elastically deformable, and
a distance from a rotary shaft of the movable fin to a distal end of the seal member attached to the movable fin is set to be longer than a distance from the rotary shaft of the movable fin to the first bumper reinforcement, and a distance from the rotary shaft of the movable fin to the distal portion of the movable fin not including the seal member is set to be shorter than a distance from the rotary shaft of the movable fin to the first bumper reinforcement.

3. A grille shutter device comprising:
a first bumper reinforcement extending in a vehicle width direction; and
a shutter mechanism that is provided with a plurality of support members extending from the first bumper reinforcement in a direction intersecting with the vehicle width direction, is supported by the plurality of support members, and regulates a flow rate of air which flows into an engine room from a grille, wherein
an end of the support member on a side opposite to the first bumper reinforcement is connected to an absorber,
the shutter mechanism includes a movable fin that is rotatably supported by the plurality of support members,
the movable fin has a distal portion provided with a seal member that is elastically deformable, and
a distance from a rotary shaft of the movable fin to a distal end of the seal member attached to the movable fin is set to be longer than a distance from the rotary shaft of the movable fin to the first bumper reinforcement, and a distance from the rotary shaft of the movable fin to the distal portion of the movable fin not including the seal member is set to be shorter than a distance from the rotary shaft of the movable fin to the first bumper reinforcement.

* * * * *